April 29, 1952 W. C. PALMER 2,594,487
GLASS DRILL
Filed Sept. 3, 1947
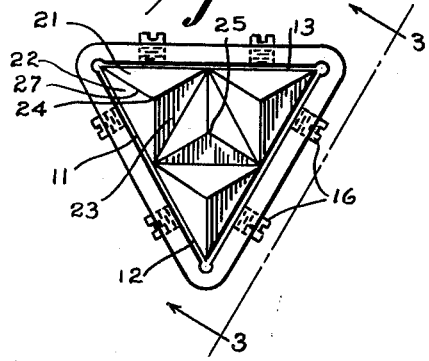
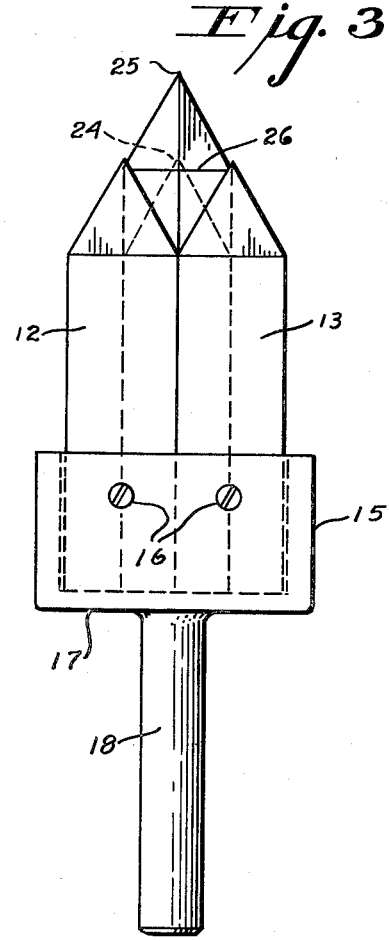
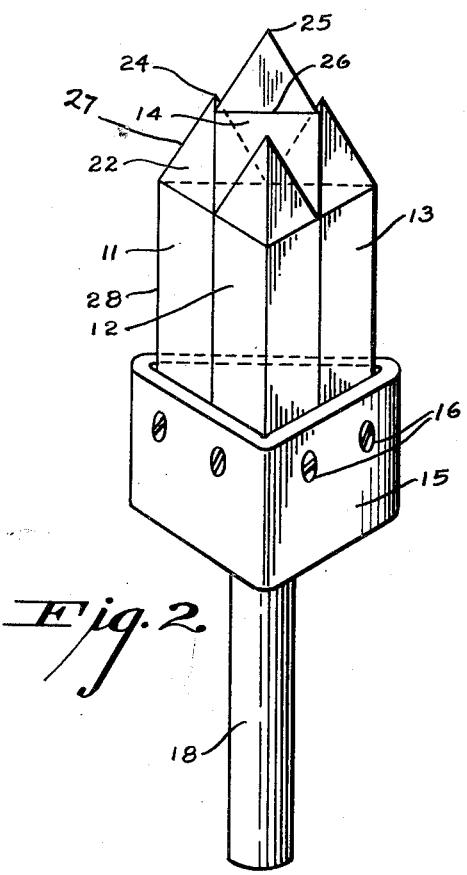
Inventor
WILBUR C. PALMER
By F. N. Knight
Attorney Patented Apr. 29, 1952

2,594,487

UNITED STATES PATENT OFFICE 2,594,487

GLASS DRILL

Wilbur C. Palmer, Corning, N. Y., assignor to Corning Glass Works, Corning, N. Y., a corporation of New York Application September 3, 1947, Serial No. 771,927

5 Claims. (Cl. 255—61)

The present invention relates to drilling apparatus especially suitable for use in drilling holes in thick glass or other thick bodies of ceramic materials and the like, and is particularly concerned with apparatus suitable for drilling holes of ½" diameter and larger.

It has been common practice for some time past to drill holes of ⅛" to ½" in diameter by the use of suitably lubricated bits comprising sticks of tungsten carbide triangular in cross-section and having working faces of pyramidal form bounded by three triangular outlines, with the common apex of these outlines being coextensive with a line drawn lengthwise through the center of the stick.

In the drilling of holes larger than ½" in diameter it has been the usual practice to resort to the use of a conventional form of tubular bit, to the end of which a suitable grinding compound is added from time to time during the grinding process. This latter form of drill is open to several objections: It is very slow; there is considerable danger of objectionably scratching the glass surface with the abrasive; and since the abrasive acts on the outer surface of the tool as well as on the glass, the tool diameter becomes smaller as grinding continues, so that the hole diameter tends to objectionably taper. To prevent chipping of the border of the perforation, it is common practice to drill part way through the body and then reverse it and drill through from the opposite side. Since the tubular form of drill has no pilot, it becomes very difficult to drill the hole about the same axial center from both sides.

One object of the present invention is a glass drill free of objections found in the use of a tubular form of drill.

Another object is a new form of glass drill adapted to drill accurately-formed holes through heavy glass bodies without the necessity of the use of an abrasive material.

A still further object is a novel form of drill composed of a cluster of drill bits adapted to drill through heavy bodies of glass in a fraction of the time required when using conventional forms of tubular bits.

A further object is a drill assembly adapted for drilling relatively large holes and having a leader or pilot bit enabling perfect alignment of holes in part drilled from opposite sides of a glass body.

Other and further objects of the present invention will be apparent from the following description and claims, and will be understood by reference to the accompanying drawing which, by way of illustration, shows a preferred embodiment of the invention.

In the accompanying drawing Fig. 1 is a plan view of the working end of a drill assembly embodying the invention.

Fig. 2 is a perspective view of the assembly.

Fig. 3 is a side elevational view of the assembly as seen when looking in the direction indicated by arrows 3—3 in Fig. 1.

Referring to the drawing in detail, the drill assembly comprises a cluster of three drill bits 11, 12, and 13, assembled about a similar drill bit 14, and clamped in a chuck 15 by suitable set screws, such as screws 16.

Each of the drill bits 11, 12, and 13 are alike, and accordingly a description of one will suffice for all. The drill bit 11 comprises a stick of tungsten carbide triangular in cross-section and having a working face of pyramidal form comprising three triangular surface areas 21, 22, and 23, respectively, with a common apex 24.

The drill bit 14 is identical to bit 11 except that it is sufficiently longer that when assembled in chuck 15, the base 26 of its working surface is back of apex 24 of bit 11 and of the apexes of bits 12 and 13; whereas, the apex or point 25 of bit 14 is well forward of bits 11, 12, and 13, bit 14 thus serving as a leader or pilot bit for the drill assembly.

The chuck 15 has a closed bottom 17 with a projecting drill shank 18 so located that it is coaxial with the drill bit 14.

In the use of the drill assembly, initially all of the drilling is done by the pilot or leader bit 14, but slightly before the depth of cut is such that the base 26 of the bit face encounters the material, the apex 24 of bit 11, and the apexes of the other drill bits 12 and 13, engage the material. As drilling proceeds, edge 27, forming the line of juncture of the working faces 21 and 22 of drill bit 11 and the corresponding edges of drill bits 12 and 13, engage the work to progressively increase the hole diameter to that represented by a circle drawn about the working edge 28 of the bit 11 and about the corresponding edges of the other two bits 12 and 13. As soon as drill point 25 passes through the work, the work may be reversed and drilling started from the other side with positive assurance that the final hole produced will be accurately formed and of uniform diameter throughout the thickness of the material.

What is claimed is:

1. A drill comprising a leader drill bit of triangular configuration in cross-section and a cluster of at least three similar drill bits arranged symmetrically about and in abutting relation with said leader bit.

2. A drill such as defined by claim 1 wherein the working ends of all the bits are substantially alike in size and cross-sectional configuration.

3. A drill comprising a leader drill bit and a cluster of three similar drill bits arranged symmetrically about said leader bit, and wherein each bit is of triangular configuration in cross-section, and each bit of the cluster is arranged with one of its flat sides abutting a flat side of the leader bit.

4. A drill such as defined by claim 3 wherein each of the bits has a pyramidal working face comprising three triangular flats having a common apex falling on a line running lengthwise through the center thereof.

5. A drill such as defined by claim 4 wherein the apexes of the triangles comprising the working faces of the bits surrounding the leader bit of the cluster terminate along a line transverse the bits in a plane intermediate the bases and apexes of the triangular working faces of the leader bit.

WILBUR C. PALMER.

REFERENCES CITED

The following references are of record in the file of this patent:

UNITED STATES PATENTS

| Number | Name | Date |
|---|---|---|
| 51,925 | Coles | Jan. 9, 1866 |
| 134,805 | Hipkins | Jan. 14, 1873 |
| 1,666,898 | Hanson | Apr. 24, 1928 |
| 2,174,389 | Poletis | Sept. 26, 1939 |
| 2,245,995 | Merry | June 17, 1941 |
| 2,337,322 | Gascoigne | Dec. 21, 1943 |